us008857333B2

United States Patent
Bassat et al.

(10) Patent No.: US 8,857,333 B2
(45) Date of Patent: Oct. 14, 2014

(54) CAM POSITIONED TO RETRACT A MECHANICAL COMPONENT

(75) Inventors: Ofer Ben Bassat, Ramat-Gan (IL); Konstantin Kupershtoch, Rehovot (IL); Avichay Mor-Yosef, Jerusalem (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 212 days.

(21) Appl. No.: 13/407,269

(22) Filed: Feb. 28, 2012

(65) Prior Publication Data
US 2013/0220220 A1    Aug. 29, 2013

(51) Int. Cl.
*B41F 21/04*    (2006.01)
*B41F 21/10*    (2006.01)
*B65H 5/12*    (2006.01)
*B65H 29/06*    (2006.01)

(52) U.S. Cl.
USPC ........... 101/409; 101/246; 101/486; 271/277; 271/82

(58) Field of Classification Search
CPC ...... B41F 21/04; B41F 21/104; B41F 21/106; B41F 21/10; B65H 29/06; B65H 5/12; B65H 2403/512; B65H 2555/24; B65H 2407/50; B65H 2601/24; B65H 2601/26; B41J 13/233

USPC ............. 101/409, 246, 230, 486; 271/277, 82
See application file for complete search history.

(56) References Cited

U.S. PATENT DOCUMENTS

| | | | |
|---|---|---|---|
| 5,105,535 A | 4/1992 | Fotte, Jr. et al. | |
| 5,862,757 A * | 1/1999 | Hauck ........................... | 101/484 |
| 6,557,844 B2 | 5/2003 | Becker et al. | |
| 7,731,190 B2 | 6/2010 | Taig et al. | |
| 8,042,465 B2 | 10/2011 | Schmidt et al. | |
| 2010/0199870 A1 | 8/2010 | Taig et al. | |

FOREIGN PATENT DOCUMENTS

CN    201183358 Y    1/2009

* cited by examiner

*Primary Examiner* — Daniel J Colilla
*Assistant Examiner* — Blake A Tankersley

(57) ABSTRACT

A cam follower is affixed to a rotary component that is in mechanical communication with a rotary source such that the cam follower travels along a path when the first rotary source is operating. The cam follower is in mechanical communication with a mechanical component such that, when the cam follower is engaged with a retract dwell section of either of a dynamic cam or a static cam, the mechanical component is retracted. The static cam may be positioned to allow the mechanical component to retract for a predetermined portion of the path.

20 Claims, 4 Drawing Sheets

CAM POSITIONED TO RETRACT A MECHANICAL COMPONENT

BACKGROUND

Some digital printers employ a laser to write a latent image on a photoconductor drum that attracts ink or toner. The ink or toner may be transferred from the photoconductor drum to a printing medium, such as paper, with an intermediate drum. An impression drum applies a force to the printing medium and intermediate drum to provide enough pressure to transfer the ink or toner to the printing medium.

The impression drum may have a gripping mechanism or assembly positioned at the drum's surface. This device grips the printing medium as the medium approaches the drum and correctly positions the paper during the transfer of the ink or toner.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

In a digital printer, like that described above, a dynamic cam is sometimes used to cause the gripping mechanism to open and close at different angular positions according to the sequence of the particular tasks being performed by the printer. The dynamic cam is also used to close the gripping mechanism as needed to avoid a collision between the gripping mechanism's components and other parts of the printer situated near the impression drum to prevent damage.

The present specification describes principles including, for example, a system for controlling a mechanical component, such as the dynamic cam and gripping mechanism described above in connection with a digital printer. Examples of the system being disclosed herein may include a system with a cam follower affixed to a rotary component that is in mechanical communication with a driving source such that the cam follower travels along a path when the driving source is operating. The cam follower may be in mechanical communication with a mechanical component such that, when the cam follower is engaged with a retract dwell section of either of a dynamic cam or a static cam, the mechanical component is retracted. The static cam may be positioned to allow the mechanical component to retract within a predetermined portion of the path, and the dynamic cam may be controlled by an independent control source.

The dynamic cam may retract the mechanical component dynamically as instructed by a controller, which may include instructions to retract the mechanical component when there is potential that the mechanical component may collide with nearby objects. However, in the event that the dynamic cam fails to effectively retract the mechanical component, the static cam is positioned such that the mechanical component is retracted along predetermined portions of the path that have a likelihood of a collision.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
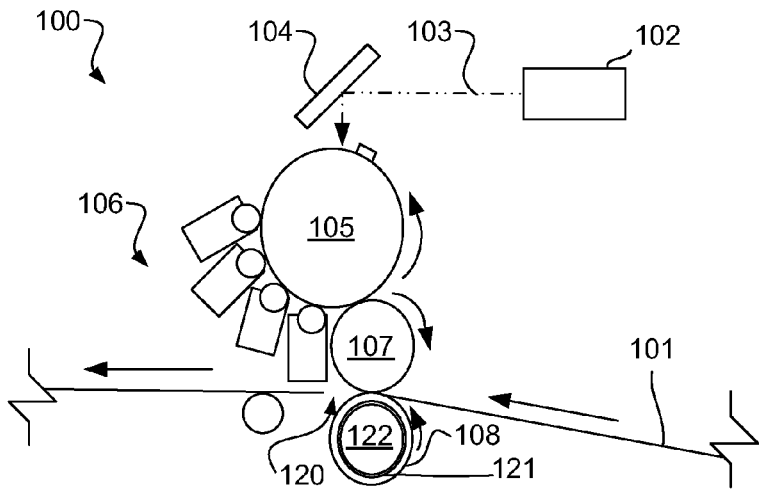
FIG. 1 is a diagram of an illustrative marking engine in a printer, according to principles described herein.

FIG. 1 is a diagram of an illustrative marking engine (100) in a printer, according to principles described herein. A printer may be any device that produces an ink image on a printing medium. A printer may be a personal printer, a copier, a monochromatic printer, a color printer, another type of printer, or combinations thereof. A printing medium (101), such as paper, is conveyed along a printing pathway within the printer. The printing medium (101) is moved towards the marking engine (100) where an image is imposed on the printing medium (101). In some examples, the printing medium is fed through the marking engine (100) as individual sheets.

The marking engine (100) may include several components that collectively produce an image on the printing medium (101). For example, a laser source (102) may emit a laser beam (103) towards an optical element (104) that directs the beam (103) towards a photoconductor drum (105). The optical element (104) may be, for example, a mirror or other reflective surface. In other examples, the optical element is a prism or another element that refracts the laser beam towards the photoconductor drum.

As the laser beam (103) contacts the surface of the photoconductor drum (105), the electric charge on the surface exposed to the beam's energy is cancelled or dispersed. Thus, the surface of the drum contains areas with different charges thereby creating an electrostatic latent image. At the next stage of the printing process, ink, from an ink source or sources (106), is used to develop the latent image. Depending on the characteristics of the system, the ink may be attracted to the charged or the discharged areas of the latent image, and the laser beam (103) writes a negative or positive image accordingly. The ink may be liquid ink or a powder ink, such as toner. In some examples, the ink is oil based and forms a thin layer on the drum's surface.

Next, the ink may be transferred onto an intermediary drum (107), such as a blanket cylinder that transfers the ink to the printing medium (101). In the illustrated example, an impression drum (108) is positioned to provide pressure to the printing medium (101) sufficient to transfer the ink from the intermediary drum (107) onto the printing medium (101). In some examples, however, the ink is rolled onto the printing medium (101) directly from the photoconductor drum (105).

A gripping mechanism (e.g., 211, FIG. 2; 300, FIGS. 3; and 400 FIG. 4) may be incorporated with or in the impression drum (108) to ensure that the printing medium (101) moves properly through the marking engine (100). As the printing medium approaches the impression drum (108), the tongs of the gripping mechanism may open to receive an edge of the printing medium (101) after which the gripping mechanism closes to hold the printing medium's edge in place. The gripping mechanism may be controlled by a cam assembly (120) that has a dynamic cam (121) and a static cam (122). The cam assembly (120) will be discussed in more detail below.

The various activities of the components of the printer and/or marking engine (100) may be coordinated together. For example, an image writing controller may send commands to the laser source (102) instructing the source to scan the laser beam over the photoconductor drum's surface and emit the laser beam at specified times to write the latent image. The rotation of the photoconductor drum (105) and the printing medium's rate of travel along the printing pathway may be timed with the commands of the laser beam source. Also, the opening and closing of gripping elements is also timed with the rotation of the drums (105, 107, 108) and receiving the printing medium (101).

Figure 2:
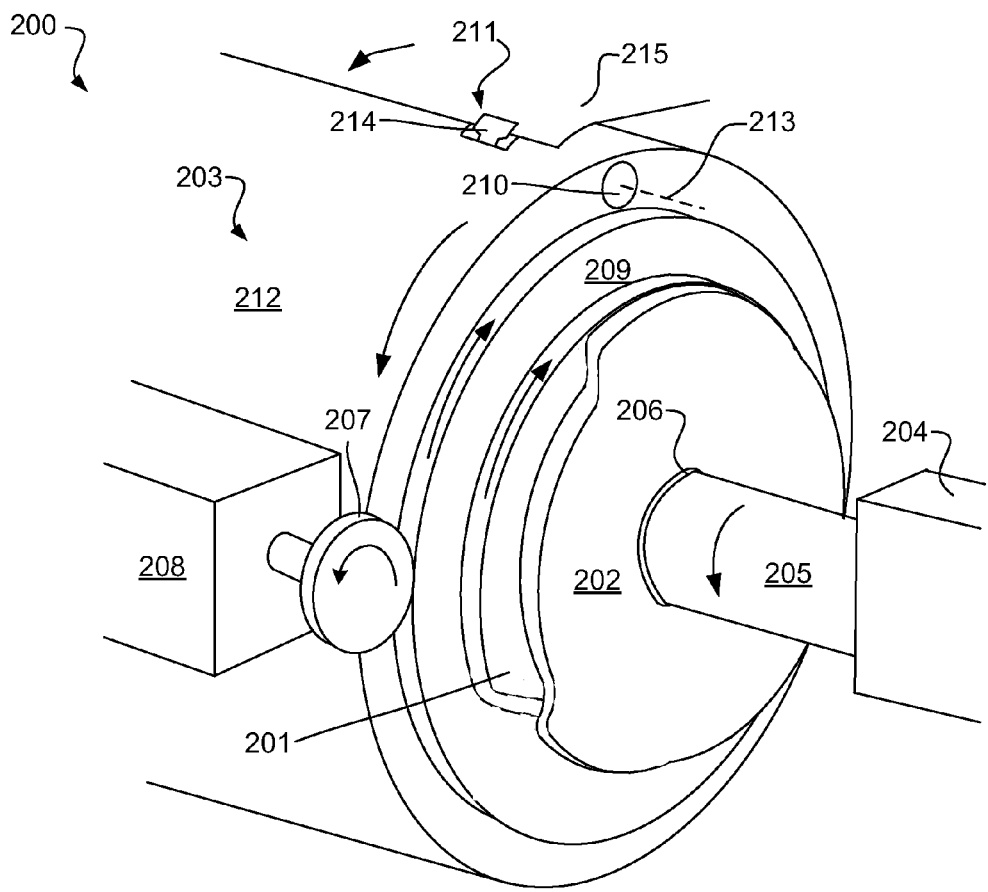
FIG. 2 is a diagram of an illustrative cam assembly, according to principles described herein.

FIG. 2 is a diagram of an illustrative cam assembly (200), according to principles described herein. In the illustrated example, the cam assembly (200) has a dynamic cam (201) and static cam (202) coaxially positioned with a drum (203). In some examples, the drum (203) is incorporated in a marking engine of a printer or other devices. A cam follower, which is in communication with both the dynamic and static cams (201, 202), is not shown for illustrative purposes, but is described in detail later on. In the example of FIG. 2, the drum (203) is rotated by a first rotary source (204), such as a motor. The torque from the first rotary source (204) is transferred from the drum (203) through an axle (205) that is partially disposed in a central opening (206) of the cams (201, 202).

In the example of FIG. 2, the dynamic cam (201) is driven by a second, independent rotary source (207) controlled by a controller (208). In the illustrated example, the dynamic cam (201) is rigidly connected to a gear (209) that is in direct communication with the second rotary source (207). Thus, the dynamic cam (201) rotates with the gear (209) as controlled by the controller (208). The controller (208) may cause the dynamic cam (201) to move with or opposite the rotation of the drum (203) at various angular positions depending on a particular job or task. The static cam (202) is statically positioned, and thus, not moved by either the first or second rotary sources (204, 207).

Both the dynamic and static cams (201, 202) may be in communication with a cam follower (not shown in FIG. 2) that is connected to a linkage (210), such as a shaft, that operates a gripping mechanism (211) incorporated in a surface (212) of the drum (203). As the cam follower moves as determined by the drum's angular position and the positions of the cams (201, 202), the linkage (210) may be rotated along its axis (213) to rotate a gripping tong (214) away from or into the drum's surface (212). In the example of FIG. 2, the controller (208) may cause the dynamic cam's movements to be timed with the rotation of the drum (203) such that the gripping mechanism (211) opens and closes appropriately to receive, hold, and release the printing medium (215).

The gripping mechanism (211) may have multiple gripping units spaced along a length of the drum (203) and/or spaced around the drum's parameter. In examples where multiple gripping units are spaced around the parameter, multiple linkages and cam followers may be used to control different gripping units. In some examples, multiple linkages and/or cam followers are controlled by the same dynamic and static cams. In the example of FIG. 2, the illustrated gripping unit includes a single tong (214). However, in alternative examples, multiple tongs are used at each gripping unit.

Figure 3:
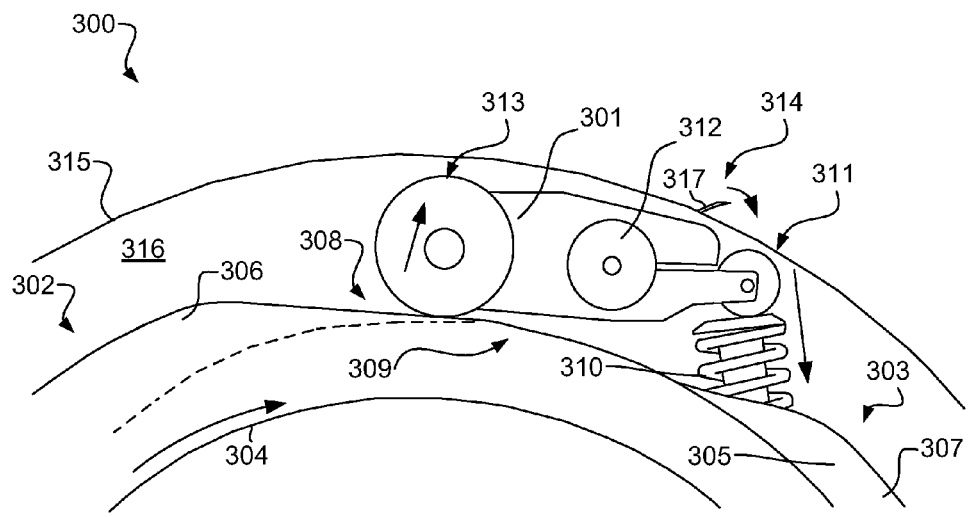
FIG. 3 is a diagram of an illustrative gripping mechanism, according to principles described herein.

FIG. 3 is a diagram of an illustrative gripping mechanism (300), according to principles described herein. In this example, the gripping mechanism (300) has a cam follower (301) positioned to contact the parameters (302, 303) of a dynamically controlled cam (304) and a statically positioned cam (305). Each cam (304, 305) has a retract dwell section (306, 307) and a protrude dwell section (308, 309). An engagement spring (310) pushes a first end (311) of the cam follower (301) upward causing the cam follower (301) to pivot around a linkage (312) and a second end (313) to engage the parameters (302, 303) of the cams (304, 305).

In the example of FIG. 3, the cam follower's second end (313) is engaged in the protrude dwell sections (308, 309) of both cams (304, 305). In the illustrated example, the dynamic cam (304) is moving such that it's retract dwell section (308) is approaching the second end (313) of the cam follower (301). As the retract dwell section (308) pushes the second end (313), the linkage (312) rotates. In this example, the linkage is a gripping shaft that is connected to a gripping unit (314) incorporated into a surface (315) of the drum (316). In this example, as the linkage (312) rotates in the direction caused by the dynamic cam (304), the tongs (317) retract into the drum's surface (315).

While a compression spring (310) is depicted to force the second end (313) of the cam follower (301) to make contact with the parameters of the cams (304, 305), other mechanisms may be used to ensure such contact. For example, torsion or tension springs may be used.

Also, while the linkage (312) is shown as a rotary shaft, other linkages may be used. For example, the cam follower (301) may be positioned to push a linkage up or pull the linkage down to control the activation of the gripping mechanism. In other examples, the movement of the cam follower (301) may cause the linkage (312) to slide along its length, which movement activates the gripping mechanism.

Figure 4:
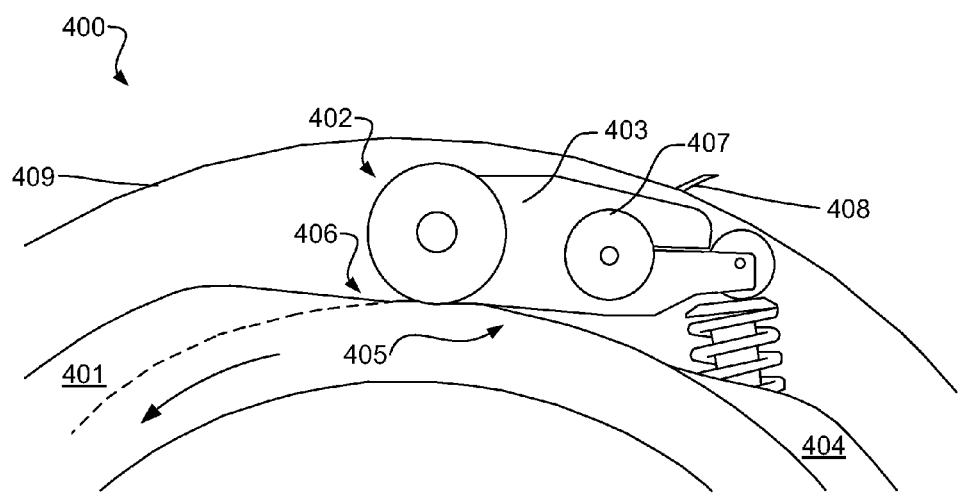
FIG. 4 is a diagram of an illustrative gripping mechanism, according to principles described herein.

FIG. 4 is a diagram of an illustrative gripping mechanism (400), according to principles described herein. In the example of FIG. 4, the dynamic cam (401) is moving such that the second end (402) of the cam follower (403) have slide into the protrude dwell sections (405, 406) of the dynamic and static cams (401, 404). As a consequence, the linkage (407) has finished rotating in a direction that causes the gripping's tongs (408) to protrude away from the drum's surface (409).

In some examples, the dynamic cam (401) is moved to control the opening and closing of the gripping mechanism (400). In such examples, the static cam (404) may be positioned to force the gripping mechanism (400) to close during a predetermined portion of the path that the gripping assembly follows if the dynamic cam fails to do so.

In some examples, the dynamic cam (401) causes the gripping mechanism to open and close according to a predefined sequence. The sequence may vary depending on the particular job or task that the printer is performing. The sequence may also include closing the gripping mechanism along predetermined portions of the gripping's path to avoid collisions with other components in the printer. Further, the dynamic cam's timing for opening and closing the gripping mechanism may take into account various factors such as a thickness of the printing medium.

While the examples of FIGS. 3 and 4 depict the retract dwell sections as a high section and the protrude dwell sections as the low sections, in some examples, the retract dwell sections are the low sections and the protrude dwell sections are the high sections.

Figure 5:
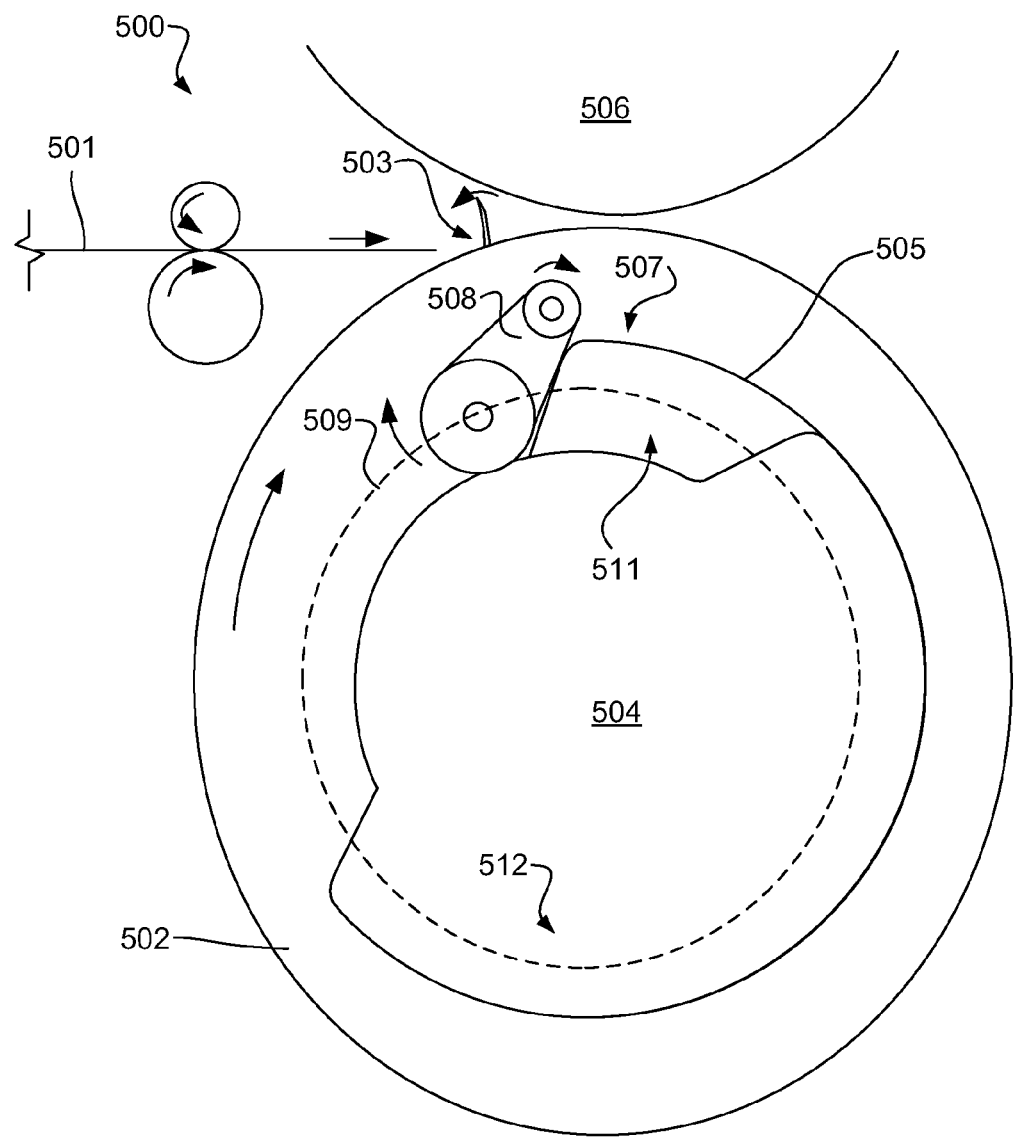
FIG. 5 is a diagram of an illustrative cam assembly, according to principles described herein.

FIG. 5 is a diagram of an illustrative cam assembly (500), according to principles described herein. In this example, a sheet (501) of printing medium is approaching the drum (502). A gripping tong (503) is protruded to receive the approaching edge of the sheet (501). However, the tong (503) should retract before it collides with drum (506). In this particular example, the dynamic cam (504), which under normal operating conditions would control the opening and closing of the gripping mechanism, has failed to move into a position to retract the gripping tong (503). Such a failure may occur due to mechanical, electrical, or programming malfunctions. However, the static cam (505) is positioned such that it's retract dwell section (507) will move the cam follower (508) into a retracted position and thereby retract the gripping tong even though the dynamic cam (504) has failed to do so. In this example, the static cam (505) is positioned to ensure that the tong (503) will be retracted in throughout all portions of the path (509) that are likely to contain an object with which the tong (503) may collide.

In some examples, a malfunction occurs when the dynamic cam (504) falls out of synchronization with the other component of the marking engine. For example, if the synchronization is off, the dynamic cam (504) may try to open the gripping assembly too early or close the gripping assembly too late to avoid a collision.

In some examples, the rotation of the drums (504, 506) in a marking engine may be inconsistent. For example, the drums (504, 506) may stop and reverse rotation to apply different color separations to the printing medium (501). Also, as the drums (504, 506) start and stop, they accelerate and decelerate. A rotary compensation mechanism may strive to compensate for inconsistent rotation caused by mechanical parts of the marking engine, such as a slipping driving belt and so forth.

The combination of starting, stopping, reversing, and compensating may introduce complexity that the controller tries to tracks to keep the dynamic cam (504) in synch with the drum. Given the complexity of this mechanical system, however, errors may be made that could result in a collision components. Consequently, the static cam (505) is rigidly fixed in place with respect to the other components of the printer. Thus, the static cam (505) is unlikely to slip out of synch and may provide a high reliability that protects against collisions.

The static cam (505) may have multiple retract dwell sections or a single retract dwell section to ensure that the tong (503) is retracted during any predetermined portions (511, 512) of the path (509) where a collision is likely to occur. For example, in a marking engine, an impression drum (502) with a retractable mechanical component, such as gripping tongs, may come into contact with another drum (506), such as the intermediary drum or drums of other subsystems within the printer. If extended, the tongs may be damaged upon impact with the other drum (506). Further, the drums (502, 506) may also receive damage upon impact as well.

In some examples, components of the printer near drum (502) may risk damage even though they do not make contact with the impression drum (502). This occurs if an extended tong's reach is far enough that the tong (503) might collide with that nearby component. In many examples, these nearby components are located in fixed positions. In such examples, the static cam (505) may be positioned such that it's retract dwell section or sections ensure that the tongs or other retractable mechanical components avoid collisions.

In some examples, the static cam's parameter is lower than the dynamic cam's parameter such that the static cam engages the cam follower only when the dynamic cam fails to close the gripping mechanism. The static cam then causes the tongs to retract to avoid damaging collisions.

In some examples, the cam assembly is arranged such that the dynamic cam exclusively interacts with the cam follower under normal operating conditions. However, the arrangement may allow the static cam to interact with the cam follower upon the dynamic cam's failure to close the gripping mechanism before approaching a dangerous condition. In some examples, the static cam also ensures that the gripping mechanism remains closed throughout the entire dangerous condition.

Figure 6:
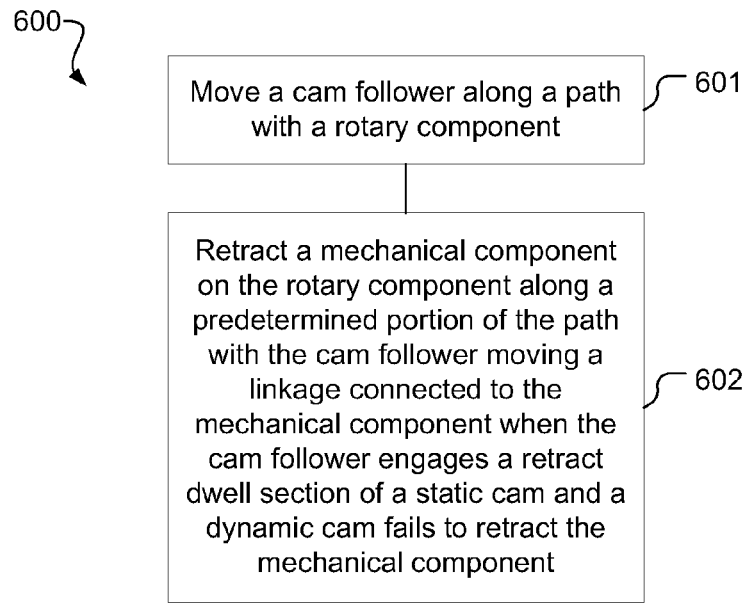
FIG. 6 is a diagram of an illustrative method for controlling a mechanical component, according to principles described herein.

FIG. 6 is a diagram of an illustrative method (600) for controlling a mechanical component, according to principles described herein. In this example, the method (600) includes moving (601) a cam follower along a path with a rotary component and retracting (602) a mechanical component on the rotary component along a predetermined portion of the path with the cam follower. This includes moving a linkage connected to the mechanical component when the cam follower engages a retract dwell section of a static cam and a dynamic cam fails to retract the mechanical component.

Figure 7:
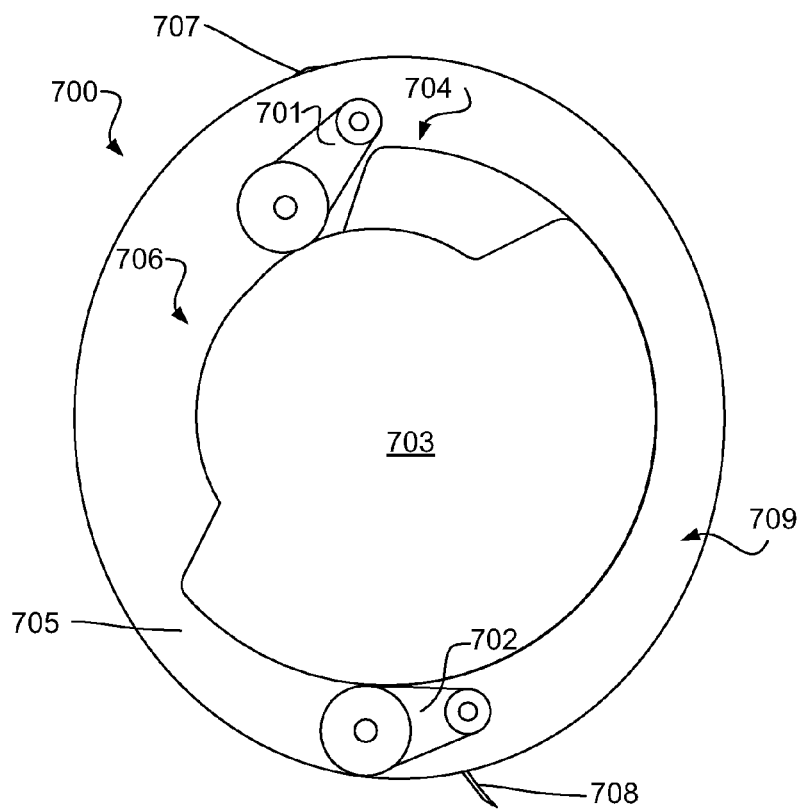
FIG. 7 is a diagram of an illustrative cam assembly, according to principles described herein.

FIG. 7 is a diagram of an illustrative cam assembly (700), according to principles described herein. In this example, a first and a second cam follower (701, 702) is controlled by a dynamic and a static cam (703, 704). The cam followers (701, 702) may be connected directly to a retractable mechanical component of the drum (705) or be in mechanical communication with retractable mechanical components through linkages.

In this example, the first cam follower (701) is engaged with a retract dwell sections (706) of both the dynamic and static cams (703, 704). In this example, a first mechanical component (707) associated with the first cam follower (701) is retracted. The second cam follower (702) is in communication with a protrude dwell section of dynamic cam (703) and a second mechanical component (708) that is associated with the second cam follower is protruding beyond surface of the drum (705).

In some examples, the mechanical component is a part of a gripping mechanism on the rotary component. In some examples, the rotary component is a drum of a marking engine in a printer. Further, the dynamic cam may be in communication with a dynamic rotary source.

While the principles described herein have been described in relation to a marking engine of a printer, the principles described herein may be applied to other devices with rotary components. For example, the principles described herein may be applied cam shafts, motors, axels, engines, pumps, other devices, and combinations thereof. Further, while the principles described herein may be depicted using a roller cam follower, the principles described herein may use other types of cam followers. For example, a non-exhaustive list of compatible cam followers includes roller followers, knife-edge followers, flat followers, oscillating cam followers, radial arm followers, offset followers, in-line followers, other types of followers, and combinations thereof. In some examples, the cam follower may have multiple arms that engage the parameters of the static and/or dynamic cams.

Further, while principles herein have been described with particular cams, other cams may be used. For example, the cam may be a linear cam, an angular cam, other type of cam or combinations thereof.

In some examples, multiple cam followers are used with the combination of the dynamic and static cams to control separate mechanical components. In some examples, the cam assembly has multiple static cams and/or multiple dynamic cams to control the same mechanical component or components.

While the static cam has been depicted as being an outer cam, in some examples, the dynamic cam or cams is positioned more distally than the static cam.

In some examples, the cam follower has a roller with a crowned section on its contact surface. A crowned section may include a midline of the roller's outer, contact surface that is the elevated above the contact surfaces' edges. A crowned section may provide for improved contact between the roller and the parameters of the static cam, the dynamic cam, or both. In some examples, a roller of the cam follower may have a doubled crowned section, one crowned section for each of the static and dynamic cams' parameters. In some examples, the roller's contact surface rolls on a parameter of both the static and dynamic cams. In some examples, a majority of the roller's contact is with the dynamic cam's parameter while a smaller portion of the contact is with the parameter of the static cam. In some examples, a cam follower may have at least one roller for each cam parameter. Thus, a single cam follower may carry a first roller for contact with the static cam and a second roller for contact with the dynamic cam. Further, in some examples, a cam follower may be custom designed to interact with the dynamic and static cams.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A system comprising:
   a cam follower being affixed to a rotary component that is in mechanical communication with a first rotary source such that said cam follower travels along a path when said first rotary source is operating;
   a dynamic cam that rotates in a direction opposite said rotary component when said rotary component is operated; and
   a static cam that does not rotate with respect to said rotary component when said rotary component is operated;
   said cam follower being in mechanical communication with a mechanical component, wherein, when said cam follower is engaged with a retract dwell section of either of the dynamic cam or the static cam, said mechanical component is retracted; and
   said static cam positioned to allow said mechanical component to retract for a predetermined portion of said path.

2. The system of claim 1, wherein said rotary component is a drum within a printer.

3. The system of claim 1, wherein said mechanical component is a part of a gripping mechanism.

4. The system of claim 1, wherein said predetermined portion of said path comprises an area in which said mechanical component, if extended, can collide with another system component.

5. The system of claim 1, wherein said dynamic cam is controlled by an independent control source, said independent control source is programmed to rotate said dynamic cam with an opposite rotation to said rotary component.

6. The system of claim 1, wherein both of said static and dynamic cams comprise a protrude dwell section that extends said mechanical component.

7. The system of claim 1, wherein said rotary component, said static cam, and said dynamic cam are substantially coaxial.

8. The system of claim 1, wherein a second cam follower being in mechanical communication with a second mechanical component, wherein when said second cam follower is engaged with said retract dwell section of either of said dynamic cam or said static cam said second mechanical component is retracted.

9. A method for controlling the system of claim 1, the method comprising:
   moving the cam follower along the path with the rotary component; and
   retracting the mechanical component on said rotary component for a predetermined portion of said path with said cam follower, said cam follower moving a linkage connected to said mechanical component when said cam follower engages the retract dwell section of the static cam substantially coaxial with said rotary component when the dynamic cam fails to retract said mechanical component.

10. The method of claim 9, wherein said mechanical component is part of a gripping mechanism.

11. The method of claim 9, wherein said rotary component is a drum in a marking engine.

12. The system of claim 1, wherein both of said static and dynamic cams comprise a protrude dwell section that extends said mechanical component.

13. The system of claim 1, wherein said rotary component, said static cam, and said dynamic cam are substantially coaxial.

14. The system of claim 1, wherein a second cam follower being in mechanical communication with a second mechanical component, wherein when said second cam follower is engaged with said retract dwell section of either of said dynamic cam or said static cam said second mechanical component is retracted.

15. A printer, comprising:
   a cam follower being affixed to a drum that is in mechanical communication with a motor such that said cam follower travels along a rotary path produced by rotation of said drum when said motor is operating;
   a dynamic cam that rotates in a direction opposite said drum during operation of said motor; and
   a static cam that does not rotate with respect to said drum when said motor is operated;
   said cam follower being in mechanical communication with a linkage that retracts a gripping mechanism when said cam follower is engaged with a retract dwell section of either of said dynamic cam or said static cam; and
   said static cam positioned to allow said gripping mechanism to close for a predetermined portion of said path.

16. The printer of claim 15, wherein said predetermined portion of said path comprises at least one other printer part with which said gripping mechanism will collide if said gripping mechanism is in an open position.

17. The printer of claim 16, wherein said at least one other printer part is another drum.

18. The printer of claim 15, wherein said dynamic cam is controlled by an independent control source, said independent control source is programmed to rotate said dynamic cam with and opposite a rotation of said drum.

19. A system, comprising:
   a cam follower being affixed at a point on a rotary component, which rotary component is in mechanical communication with a first rotary source that, when operating, rotates said rotary component such that said cam follower travels around a rotary path when said first rotary source is operating to rotate said rotary component;
   a dynamic cam that rotates in a direction opposite said rotary component when said rotary component is operated; and
   a static cam that does not rotate with respect to said rotary component when said rotary component is operated;
   said cam follower being in mechanical communication with a mechanical component, wherein, when said cam follower is engaged with a retract dwell section of either of the dynamic cam or the static cam, said mechanical component is retracted; and said static cam positioned to allow said mechanical component to retract for a predetermined portion of said path.

20. The system of claim 19, wherein said predetermined portion of said path comprises an area in which said mechanical component, if extended, can collide with another system component.

* * * * *